INVENTORS
ETIENNE ALIZON
CLAUDE MONIN
BY Paul M. Craig, Jr.
ATTORNEY

INVENTORS
ETIENNE ALIZON
CLAUDE MONIN
BY Paul M. Craig, Jr.
ATTORNEY

United States Patent Office 2,946,896
Patented July 26, 1960

2,946,896

MAGNETOSTATIC RELAYS

Etienne Alizon, Le Chesnay, and Claude Monin, Villennes-sur-Seine, France, assignors to Compagnie Industrielle des Telephones, a corporation of France Filed Oct. 29, 1957, Ser. No. 693,180

Claims priority, application France Nov. 9, 1956

6 Claims. (Cl. 307—88)

The present invention relates to magnetostatic relays which are suitable for use more especially in automatic telephony and remote control systems.

Magnetostatic relays are already known and may be of the kind described in French Patent 1,127,470, which provides an output current capable of assuming two predetermined values for given values of the control ampere-turns. However, these relays have the drawback that their output impedance is relatively low, which limits their application to low-resistance circuits, and the output current is not absolutely constant as a function of the control ampere-turns when the relay is in the operated position. In addition, such relays necessitate the use of a costly filtering inductance of considerable volume, together with a plurality of rectifiers. A magnetostatic relay comprises the elements of a magnetic amplifier, particularly one or more control windings which can be fed with a direct current known as control current, and an output circuit, which depending on the control currents in the control windings, is or is not supplied with direct current referred to as output current.

An object of the present invention is to overcome the aforementioned disadvantages, and accordingly the invention provides a magnetostatic relay, comprising a magnetic amplifier including at least one winding supported by a saturable magnetic core, and a rectifier connected in series with said winding, wherein there are connected in parallel with the output terminals of the magnetic amplifier two circuit branches, one of which comprises a chopping device which varies the potential differences between the said output terminals and which can reverse this potential difference, while the other branch comprises a transistor connected between the emitter and the base, the load impedance of the utilization circuit of the relay being connected in the circuit of the collector of the transistor.

In order that the invention may be more clearly understood and readily carried into effect, one embodiment thereof will now be described with reference to the accompanying drawings, in which.

Figure 1:
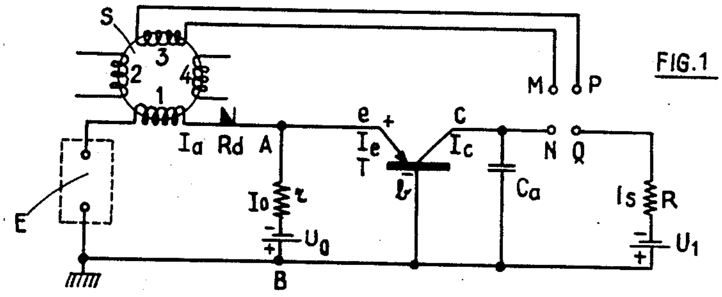
Figure 1 is the circuit diagram of the relay.

The relay illustrated in Figure 1 comprises a magnetic amplifier having output terminals A and B and including a saturable magnetic circuit S which supports a winding 1 connected in series with a rectifier R*d* fed with alternating current from a source E, a control winding 2 which receives the direct current signal, a feedback winding 3 and a polarizing or biasing winding 4. Throughout the following description the algebraic sum of the ampere-turns of the widings 2, 3 and 4 will be called the "control ampere-turns" and is referred to herein by the symbol $N_cI_c$ with the further addition of subscripts in certain instances to designate particular values of control ampere-turns at certain points on the operating curves of Figures 2–7.

The relay also comprises, between the points A and B, a chopping device comprising a resistance *r* connected in series with a constant-current source of electromotive force $U_0$, the resistance *r* being connected to the negative pole of the said source. Also connected to the point A is the emitter *e* of a transistor T of the p-n-p junction type, of which the base *b* is connected to the point B. A filtering condenser $C_a$ is connected in shunt between the collector *c* and the base *b* of the transistor.

The collector *c* of the transistor is connected to a load resistance R, the other end of which is connected to the negative potential of a current source of electromotive force $U_1$, which has an absolute value greater than $U_0$. The positive terminals of the sources $U_0$ and $U_1$ are connected to the common point B, which is in turn connected to the earthed terminal of the source E.

If desired, the feedback winding 3 may be provided between the collector *c* of the transistor and the load resistance R, with the aid of the terminals NQ and MP, depending upon whether the connections MN and PQ are established and NQ broken, or whether the connections MN and PQ are broken and NQ established.

Since the introduction of the feedback winding 3 in series with the load resistance only constitutes one possibility of the invention, it will be first assumed that the point N is connected to the point Q and that the connections MN and PQ are not established.

Figure 2:
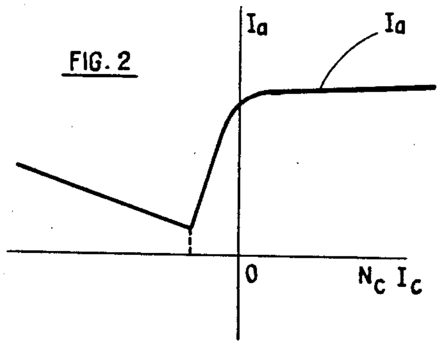
Figures 2 to 7 are curves relating to the operation of the relay according to Figure 1.

Figure 2 shows the curve of the output current $I_a$ as a function of the control ampere-turns $N_cI_c$ of the magnetic amplifier, the current $I_a$ being that flowing through the winding 1 and the rectifier R*d* at different values of the control ampere-turns supplied by the windings 2 and 4.

The transistor illustrated in Figure 1 being assumed to be of the p-n-p junction type, the emitter *e* must be positive in relation to the base *b* in order that the transistor may be conductive. If the current across the resistance *r* is called $I_o$, the value of the E. M. F. $U_0$ must be lower than the voltage drop $rI_o$ in order that the transistor may be conductive, that is to say, we must have $U_0<rI_o$. If, on the other hand, we have $U_0>rI_o$, the potential of the emitter is negative in relation to the base and the transistor is not conductive.

The voltage $rI_o$ may therefore be considered as a threshold value.

The current $I_o$ is therefore the threshold current corresponding to the voltage drop $rI_o$.

Figures 3, 4:
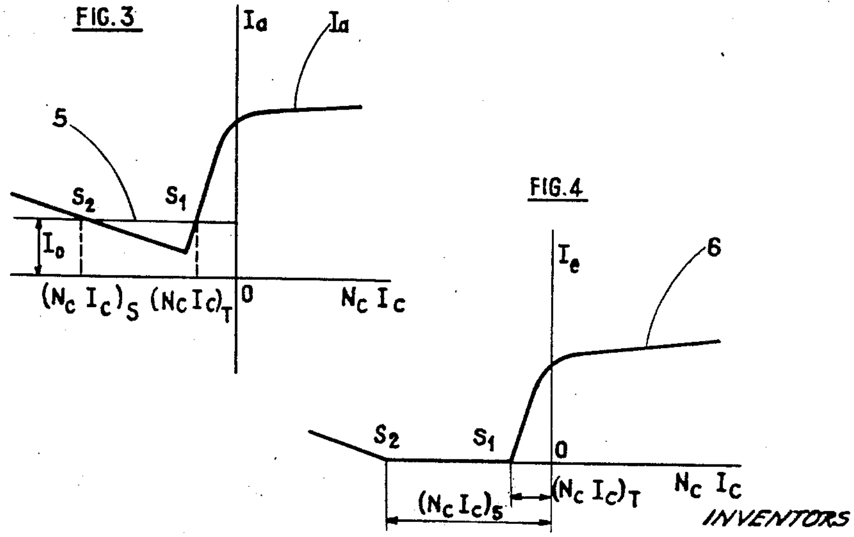
Figure 5:
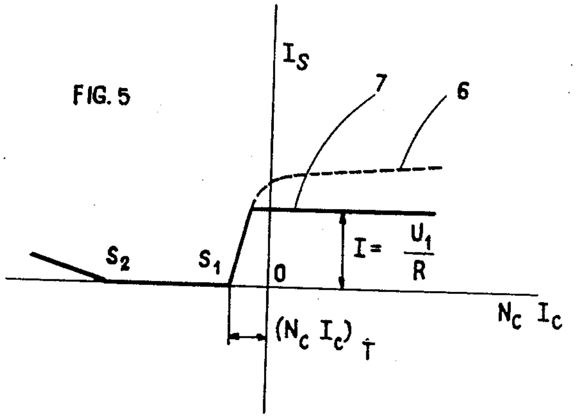

Figure 3 shows on the one hand the curve $I_a$ of Figure 2 and on the other hand the curve 5 of the threshold current $I_o$. For a given arrangement, the value $I_o$ is obviously constant, and the straight line $I_a=I_o$ which represents it is parallel to the axis of the abscissae, and intersects the curve $I_a$ at two points $S_1$ and $S_2$, which corresponds to control ampere-turns values of $(N_cI_c)_T$ and $(N_cI_c)_S$ respectively.

The curve of the current $I_e$ at the input of the emitter *e* as a function of the control ampere-turns $N_cI_c$ of the magnetic amplifier is that shown at 6 in Figure 4.

It will be seen that current $I_e$ is zero for all the control ampere-turn values between the two points $S_1$ and $S_2$, thus giving the effect that the magnetic amplifier is blocked by the transistor at all the values $I_a$ of its output which are lower than the threshold current $I_o$.

The point $S_1$ corresponds to the number of control ampere-turns $(N_cI_c)_T$ for rendering the device operative.

It has been seen that if the current $I_a$ at the output of the magnetic amplifier were larger than a current $I_o$ giving a threshold polarization, the transistor would become conductive and the current across the collector would then follow substantially the modulation of the current in the emitter.

The condenser *Ca* disposed between the base and the collector of the transistor constitutes a much lower impedance for the alternating current than the load resistance R which, on the other hand, is high. It thus offers to the alternating component of the output current a path which enables it to avoid passing through the utilization circuit.

The mean output current across the load resistance R is substantially equal to:

$$I_S=\frac{U_1}{R}$$

This output current changes from zero value to the value $$\frac{U_1}{R}$$

when the control ampere-turns exceeds the value $(N_cI_c)_T$ in increasing to the right along the axis of abscissae of the control ampere-turns. The curve of this current thus becomes the curve 7 (see Figure 5).

Figure 6:
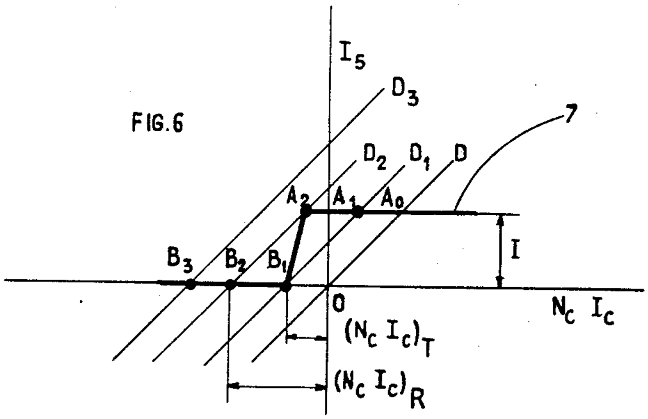

If now, referring to the diagram of Figure 1, the connections MN and PQ are established and the previous connection NQ is broken, the utilization current is thus introduced into the feedback winding 3 of the magnetic amplifier. In this case, the output current $I_S$ for $N_cI_c=0$ is given, as indicated in Figure 6 by the intersection of the curve 7 with the feedback line D, i.e. the point $A_0$. The slope of the line D is defined by the ratio of the number of turns of the feedback winding 3 to the number of turns of the control windings 2 and 4. The characteristic operating point when $N_cI_c$ is different from zero is given by the intersection of the curve 7 with a straight line parallel to the line D and displaced along the axis of the abscissae by a distance algebraically equal to $N_cI_c$.

It will thus be seen that when the control ampere-turns has a value $(N_cI_c)_T$ the corresponding line $D_1$ intersects the curve 7 at $B_1$ and $A_1$, that when the control ampere-turns has a value $(N_cI_c)_R$ the corresponding line $D_2$ intersects the curve 7 at $B_2$, and $A_2$, and that the value of control ampere-turns is less than $(N_cI_c)_R$ there is only one possible point of intersection of any corresponding line $D_3$ with the curve 7, for example $B_3$. When the line D is situated between the lines $D_1$ and $D_2$, there are three possible points of intersection, but the centre point corresponds to a state of unstable equilibrium of the system.

Figure 7:
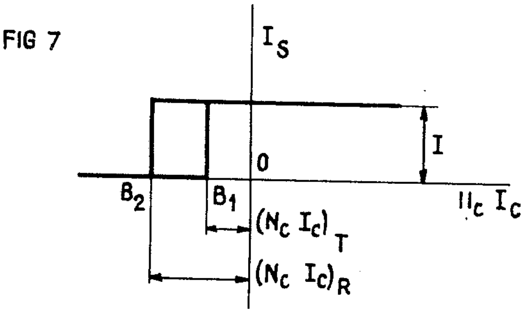

The curve shown in Figure 7 is the characteristic curve proper of the relay according to the invention which gives a zero output current for the control ampere-turns $N_cI_c<(N_cI_c)_R$, and supplies either a zero current or a constant current of strength I for $$(N_cI_c)_R<N_cI_c<(N_cI_c)_T$$

depending upon whether $N_cI_c$ has reached its value through increasing or decreasing values. The point $B_1$ corresponding to the value $(N_cI_c)_T$ and the point $B_2$ corresponding to the value $(N_cI_c)_R$ are called the rising or operating point and the falling or non-operating point respectively. Accordingly, the output current which passes through the load resistance R assumes either a zero value or a constant value I depending upon the value of the control currents supplied to the control windings 2 and 4 of the magnetostatic relay as illustrated in Fig. 1.

It is possible to provide a source of constant current having an E.M.F. $U_2$ between the base *b* of the transistor and the common point B, the base *b* being connected to the terminal of negative polarity of the source and the point B being connected to the terminal of positive polarity, the E.M.F. of this source being smaller in absolute value than $U_0$. Under these conditions, the threshold current would be determined by the equation $$I_o=\frac{U_0-U_2}{r}$$

Instead of a p-n-p-transistor, it is also possible to use an n-p-n-transistor provided that the polarities of the current sources $U_0$ and $U_1$ and the direction of the rectifier R*d* are reversed. The constant-current sources need not be separated as is indicated in Figure 1, but may consist of a single battery having a number of taps.

The new relay according to the invention has the advantage of being less bulky and less costly than the prior devices by reason of the fact that it does not necessitate an inductance.

What is claimed is:

1. A magnetostatic relay, comprising a magnetic amplifier including a saturable magnetic core with at least one winding supported thereby, and a rectifier connected in series with said winding, wherein there are connected in parallel across the output terminals of the magnetic amplifier two circuit branches, one of which comprises a chopping device which varies the potential difference between the said output terminals and which can reverse this potential difference, while the other branch comprises a transistor connected between the emitter and the base, a load impedance of the utilization circuit of the relay being connected in the circuit of the collector of the transistor.

2. A magnetostatic relay according to claim 1, wherein said magnetic amplifier has an operating winding fed with alternating current, and connected in series with a rectifier, and also has at least one control winding, the chopping device being formed by an impedance and a source of constant current arranged in parallel with the input of the transistor.

3. A magnetostatic relay according to claim 2, wherein the source of constant current supplies a current of the same direction as that supplied by the amplifier.

4. A magnetostatic relay according to claim 3, wherein a condenser is connected between the base and the collector of the transistor.

5. A magnetostatic relay according to claim 4, wherein a further source of constant current is provided in series with the load impedance of the relay, the terminals of like polarity of the two constant-current sources being connected together.

6. A magnetostatic relay according to claim 5, wherein the circuit of the collector of the transistor includes a feedback winding supported by the magnetic core of the magnetic amplifier.

References Cited in the file of this patent

"A Predetermined Scaler Utilizing Transistors and Magnetic Cores" by R. T. Vannice and R. C. Lymon. Proceedings of the N.E.C., Oct. 3–5, 1955, vol. XI, pp. 859–865.